United States Patent
Umarov et al.

(10) Patent No.: US 7,640,747 B2
(45) Date of Patent: Jan. 5, 2010

(54) METHOD FOR CONVERTING THERMAL ENERGY INTO USEFUL WORK

(75) Inventors: Georgy Ramasanovich Umarov, Moscow (RU); Sergey Ivanovich Boychenko, Moscow (RU); Valery Mikhaylovich Petukhov, Moscow (RU)

(73) Assignee: Solaris Holdings Limited, St. Helier, Channel Islands, NJ (US)

( * ) Notice: Subject to any disclaimer, the term of this patent is extended or adjusted under 35 U.S.C. 154(b) by 852 days.

(21) Appl. No.: 10/533,216

(22) PCT Filed: Nov. 19, 2003

(86) PCT No.: PCT/RU03/00503

§ 371 (c)(1),
(2), (4) Date: May 23, 2005

(87) PCT Pub. No.: WO2004/046546

PCT Pub. Date: Jun. 3, 2004

(65) Prior Publication Data

US 2006/0042248 A1    Mar. 2, 2006

(30) Foreign Application Priority Data

Nov. 21, 2002  (RU) ............................... 2002131190

(51) Int. Cl.
*F01K 1/00*        (2006.01)
(52) U.S. Cl. .......................................... 60/643; 60/645
(58) Field of Classification Search ................... 60/643, 60/645
See application file for complete search history.

(56) References Cited

U.S. PATENT DOCUMENTS

| 2,948,861 | A | * | 8/1960 | Babb ............................. 331/3 |
| 3,940,298 | A | | 2/1976 | Beckert et al. |
| 4,348,765 | A | | 9/1982 | Oettinger |
| 4,756,158 | A | | 7/1988 | Arvola et al. |
| 6,465,965 | B2 | * | 10/2002 | Nelson .................. 315/111.81 |

FOREIGN PATENT DOCUMENTS

| RU | 2078253 C1 | 4/1997 |
| RU | 2162161 C2 | 1/2001 |

OTHER PUBLICATIONS

International Search Report for PCT/RU2003/000503 dated Mar. 25, 2004.
International Preliminary Examination Report for PCT/RU2003/000503 dated Mar. 17, 2005 (with English language translation).

* cited by examiner

*Primary Examiner*—Hoang M Nguyen
(74) *Attorney, Agent, or Firm*—Baker & McKenzie LLP

(57) ABSTRACT

A method for providing the interaction of the working medium with the heat energy source and also the interaction of the working medium with the additional low-temperature energy source, wherein the positron state of the Dirac's matter is used as said additional low-temperature energy source, and the interaction of the working medium with the additional low-temperature energy source is performed by bringing the working medium into the quantum-mechanical resonance with said state of matter. That is, in order to convert the heat energy into useful work, the capabilities of the quantum-mechanical resonances of the system 'working medium—additional low-temperature energy source' are used, i.e. in this case capabilities of the system 'working medium—positron state of the Dirac's matter' are used.

3 Claims, No Drawings

METHOD FOR CONVERTING THERMAL ENERGY INTO USEFUL WORK

FIELD OF THE INVENTION

The invention relates to heat power engineering, in particular, to the methods that use working medium for producing useful work from the heat of an external source.

BACKGROUND

A method for converting heat of an external source into mechanical work is known from the prior art (RU, 2078253, IPC6 F 03 G 7/06, 20.04.97), said method allows raising the efficiency of a thermal generating set to a value close to 1, i.e. to the full conversion of heat into mechanical work.

A method realized in the compressor free cycle of the closed gas turbine power plant is known (Leontiev A. I., Shmidt K. L. "Compressor Free Cycle in the Closed Gas Turbine Power Plant//Izvestia RAN. Power Engineering.—1997—No. 3—pp. 132-141), said method is as efficient as the Carnot cycle, in which the additional low-temperature power source (refrigerator) is used. When this method is realized a significant part of the input heat energy is lost in the refrigerator, especially when external heat sources with sufficiently high temperature are used.

A method is known (RU, 2162161, IPC7 F 03 G 7/06, 20.01.2001), upon the realization of which the highest efficiency of the thermal generating set is achieved by complete conversion of the working medium heat received from the external source into mechanical work. This method comprises the interaction of the working medium with a heat energy source, in particular, heat energy from the external power is conferred to a working medium flow, said flow is expanded by mechanical work, and the power interchange with an additional low-temperature heat energy source is performed, for which a part of the general flow of the working medium with elevated density is used.

Essentially this method realizes the process of energy transmission inside the system 'working medium—additional low-temperature energy source'. The method allows obtaining the efficiency of thermo-mechanical transformations close to 1 and using low-temperature heat energy sources. However, this is possible only due to the use of a special fairly complex system of regenerating heat energy of the working medium expanded after performing a mechanical work.

DETAILED DESCRIPTION

According to one embodiment of the disclosed invention, the invention provides a method for converting heat energy into useful work having the efficiency almost on the theoretical level, in which the processes that arise under certain conditions in the working medium on the quantum level are used for creating the additional low-temperature energy source. The method is also directed to expanding the range of types of useful work obtained using the method.

The method provides the interaction of the working medium with the heat energy source and also the interaction of the working medium with the additional low-temperature energy source, wherein the positron state of the Dirac's matter is used as said additional low-temperature energy source, and the interaction of the working medium with the additional low-temperature energy source is performed by bringing the working medium into the quantum-mechanical resonance with said state of matter. That is, in order to convert the heat energy into useful work, the capabilities of the quantum-mechanical resonances of the system 'working medium—additional low-temperature energy source' are used, i.e. in this case capabilities of the system 'working medium—positron state of the Dirac's matter' are used.

The teaching of the physical essence of positron state of the Dirac's matter, which was disclosed in details in the document 'The Principles of Quantum Mechanics' by P. A. M. Dirac. SECOND EDITION. OXFORD. 1935, allows making a conclusion that the temperature of this state of matter is close to $-273°$ C. This very known property of the matter offers to consider it to be close to the ideal low-temperature energy source. Thus, when the working medium is brought into quantum-magnetic resonance with the positron state of the Dirac's matter, a transmission of energy from the working medium to the low-temperature source occurs thereby producing useful work.

In particular, as an initiating exposure for the purpose of bringing said system into quantum-mechanics resonance, the density of energy per unit of the working medium volume as well as the required density of the energy impulse or the moment thereof are provided, and the substance is used as the working medium, said substance is being in any state of aggregation, including a solid body, liquid, gas, plasma or a combination thereof. Hereafter in the description the term 'substance' will be used interchangeably with the term 'working medium'. Conferring to the substance said exposures for creating the resonance, causes polarization processes in the positron state of the Dirac's matter similarly to the conditions of the electron-positron couple generation in the micro-volume for a single couple as described in A. I. Ahiezer, V. V. Berestetsky "Quantum Electrodynamics", Nauka—Moscow, 1969. As follows from the aforementioned sources, the process of polarization in the positron state of the Dirac's matter is accompanied by excitation of particles and antiparticles.

The conditions for creating resonance with the positron state of the Dirac's matter are based either on the energy and impulse or angular impulse conservation law, and are determined by the following correlations.

The energy density in the substance portion subjected to the exposure re-calculated on a per particle base is equal to:

$$E_\Pi = 2mc^2[1+m/M] \qquad (1)$$

wherein
m is the electron mass,
c is the light speed,
M is the substance molecule mass.

Subject to the proviso that (1) $E_\Pi \approx 1.02 \times 10^6$ eV, two energy quantums under $E_K \approx 0.51 \times 10^6$ eV are absorbed by two oppositely directed impulses p (arrow).

$$|p(\text{arrow})| = E_\Pi/C \qquad (2)$$

It is also possible that some collective polarization modes of the positron state of the Dirac's matter are excited at lower energy densities under the following formula:

$$e^2/\hbar c \times mc^2 \approx 3.73 \times 10^3 \text{ eV} \qquad (3),$$

wherein $e^2/\hbar c = 1/137$ — the fine structure constant.

As such the electron-positron couple does not arise, but the resonance absorption of energy occurs, the energy is transited from the substance to the positron state of the Dirac's matter.

In the instances when the substance energy density is insufficient to excite antiparticles (positron, anti-neutron, anti-meson) the energy may be absorbed through collective fluctuations of the polarizability of the positron state of the Dirac's matter. This process leads to the energy transfer from the substance with the temperature $t_2 \geq 25°$ C. to the positron state of the Dirac's matter that has a temperature close to the absolute zero of temperature scale, i.e. $-273.16°$ C.$<t_1<-270.76°$ C. At that the $t_1$ temperature almost does not increase because of the practically unlimited thermal capacity of the positron state.

Generating electron-positron couples in the quantum-mechanics resonance causes the development of the following process. The antiparticle positron interacts with the substance emitting energy in the form of the heat, which causes a raise of temperature $t_2$, and also separation of electric charges and generation of electromotive force (emf). Thus, the amount of heat energy to be converted into useful work increases significantly. Besides, the opportunity arises to vary the result obtained (the type of useful work). For instance it is possible to get more heat and less emf and to create efficient heaters. It is possible to convert most of the useful work into emf and to create efficient electrical power generators. When most heat energy is converted into the change of the gravitational field, a Searl Effect Generator (SEG) can be provided.

The disclosed method can be realized when the substance is used, said substance being in any of the aggregation states, including a solid body, liquid, gas, plasma or any combination thereof.

The work of the heat engine that realizes the claimed method, i.e. introducing into the system 'substance-positron state of the Dirac's matter' the quantum-magnetic resonance, can be exposed by changing the external thermodynamic freedoms of said system the substance through, such as the temperature, pressure, chemical formulation, or by changing external fields (electric, magnetic, electromagnetic, spinor) depending on the state of aggregation of the substance, which is under the impact.

A liquid substance having the temperature of $t_2=25°$ C. (ambient temperature) can be considered by the way of example. A flow of liquid is provided using any known methods, e.g. those described in the prototype, wherein a part of said flow reaches the flow speed conforming to the conditions (1) or (3), that leads to direct interaction with the positron state of the Dirac's matter with $t_1<-270.76°$ C. The transition of heat from the substance to the positron state allows obtaining useful work with the efficiency equal to:

$$\text{Efficiency}=(t_2-t_1)/t_2=((t_2+273.16° \text{ C.})-(t_1+273.16° \text{ C.}))/(t_2+273.16° \text{ C.})=0.992 \quad (4)$$

This is the first cycle of the heat engine work. The second cycle lies in the appearance of the positron from the positron state of the Dirac's matter and the interaction thereof with the substance (annihilation) with emission of additional energy in the form of the heat, which changes the reserve of the substance heat energy. This, in turn, allows decreasing the consumption of the heat energy of the external source, thus getting not only the maximal efficiency, but also raising the efficiency of the heat engine, i.e. increasing the heat portion used for producing useful work. Besides, depending on the conditions that determine which part of the atom or the molecule interacts with the positron, one can obtain an excessive charge, if the positron annihilates e.g. with the neutron in the heavy water, in which case the excessive charge that is collected as useful work appears together with excessive heat obtained in the second cycle of the heat engine.

The heat engine is considered by the way of a second example, wherein a rotating solid body is used as the substance. On the outer part of the rotating solid body when it reaches an appropriate angular velocity $\omega$ the conditions are created that conform to correlations (1) or (3). These conditions are easier to obtain on the outer part of the body as the linear velocity v equals:

$$v=R\omega \quad (5),$$

wherein R is the distance from the rotation centre to the point where v is reached.

In this case the M (mass) of the formula (1) is being the solid body substance molecule, and the law of the conservation of impulse is replaced by the law of conservation of the moment of impulse. This happens due to that under the quantum mechanics laws a definite value is assigned either to the particle impulse or to the moment of the particle impulse, but not to both quantities at the same time. In the second cycle of this heat engine, the positron can annihilate with the substance not only releasing a charge but also imparting an additional moment of impulse on the substance. This process also raises the efficiency of the heat engine that produces additional mechanical work and an excessive charge.

So, it should be obvious from the provided examples that depending on the state of aggregation and the chemical formulation of the substance it is possible either to obtain useful work while simultaneously cooling the environment where the main resonance occurs under formula (3) or to decrease the amount of substance by annihilation thereof but without cooling the environment, or to combine these results.

It was disclosed earlier (Umarov G. R., Firsanov F. F., Vinogradov V. A. 'Solving the Problem of Many Bodies and the Mechanism of Solid Body Melting' in "Melts" issued by AN USSR, 1990, No. 3, pp. 25-31; and Umarov G. R. et al. "Mechanisms of First Type Phase Changes in Metals and Semiconductors under the Influence of High Pressure and Electrostatic Field" in "High Pressure Physics and Engineering, 1990, No. 33, pp. 10-44) that the fluctuations of the positron state of the substance per se cannot lead to spontaneous appearance of positrons as the appropriate phase change conditions were not created, i.e. the appearance of positrons under the considered conditions leads to the absolute thermodynamic instability of the positrons regarding said change. In the heat engine according to the claimed method, the conditions are provided when the positron does not pass back as the line of absolute instability is overcome. Thereby an opportunity arises for annihilation of the positron with the substance atomic nuclei with simultaneous emission of long-wave photons, i.e. the substance receives additional heat and, consequently, the engine efficiency arises.

Thus, the disclosed method allows converting the heat energy into useful work with the efficiency close to the theoretical one using in-depth processes in the working medium without using complex technical systems for energy regeneration, and also expanding the range of useful work obtained when the method is realized.

The following further effects may occur:

transmutation of the substance nuclei, possibility of transmitting the energy to specified distances.

The disclosed method can be used in the industry that requires significant amounts of electrical energy, e.g. in non-ferrous metal industry where 80% of the product cost is the cost of the power consumption with simultaneous cooling of hot shops of hazardous production facilities. The method can also be used to create a highly efficient energy source in the transport sector and a number of other industries that were mentioned above.

We claim:

1. A method for converting heat energy into useful work comprising the interaction of the working medium with an energy source, and also the interaction of the working medium with the additional low-temperature energy source, characterized in that the positron state of the Dirac's matter is used as said additional low-temperature energy source, and the interaction of the working medium with the additional low-temperature energy source is performed by bringing the working medium into the quantum-mechanical resonance with said state of matter.

2. The method of claim 1, wherein as an initiating exposure for the purpose of bringing into quantum-mechanics resonance, the density of energy in the working medium and the density of the energy impulse or the moment thereof are provided.

3. The method of claim 1, wherein, substance is used as the working medium, said substance is being in any state of aggregation, including a solid body, liquid, gas, plasma or a combination thereof.

* * * * *